United States Patent [19]

Lucas

[11] Patent Number: 5,358,076
[45] Date of Patent: Oct. 25, 1994

[54] INDICATOR UNIT FOR AN AIR BRAKE SYSTEM

[75] Inventor: Richard L. Lucas, Owosso, Mich.
[73] Assignee: Midland Brake, Inc., Kansas City, Mo.
[21] Appl. No.: 102,591
[22] Filed: Aug. 5, 1993
[51] Int. Cl.⁵ ............................................. F16D 66/00
[52] U.S. Cl. .................... 188/1.11; 116/208
[58] Field of Search ............... 188/1.11, 79.55, 196 A, 188/196 B, 214; 116/208, 285; 192/111 A

[56] References Cited

U.S. PATENT DOCUMENTS

| | | | |
|---|---|---|---|
| 2,379,796 | 7/1945 | Freeman et al. | 188/79.55 X |
| 4,249,644 | 2/1981 | Urban | 192/111 A X |
| 4,776,438 | 10/1988 | Schandelmeier | 188/1.11 |
| 5,181,440 | 1/1993 | Jagt | 188/1.11 X |

FOREIGN PATENT DOCUMENTS 2137715 10/1984 United Kingdom ............... 188/1.11

Primary Examiner—Robert J. Oberleitner
Assistant Examiner—Kevin D. Rutherford
Attorney, Agent, or Firm—Leydig, Voit & Mayer, Ltd.

[57] ABSTRACT

An indicator unit for a vehicle air brake system is provided which includes a brake rod mounted for movement between a non-braking first position and a predetermined safe maximum braking second position. A pivotally mounted slack adjuster is connected to the brake rod and is responsive to the movement of the rod. An indicator unit is provided which has a first section removably mounted on the connection between the rod and adjuster, a second section retained in a predetermined alignment with the rod, and a third section angularly disposed relative to the second section. The unit third section is provided with angularly disposed, exposed, first and second reference marks. When the rod is in the first position, the first reference mark is aligned with a predetermined first segment of the adjuster. When the rod is in the second position, the second reference mark is aligned with the predetermined segment of the adjuster. The alignment of the second reference mark with the adjuster segment is indicative that the rod has traversed 80%, or the limit, of its safe braking stroke and thus indicates adjustment of the brake system is warranted.

10 Claims, 2 Drawing Sheets

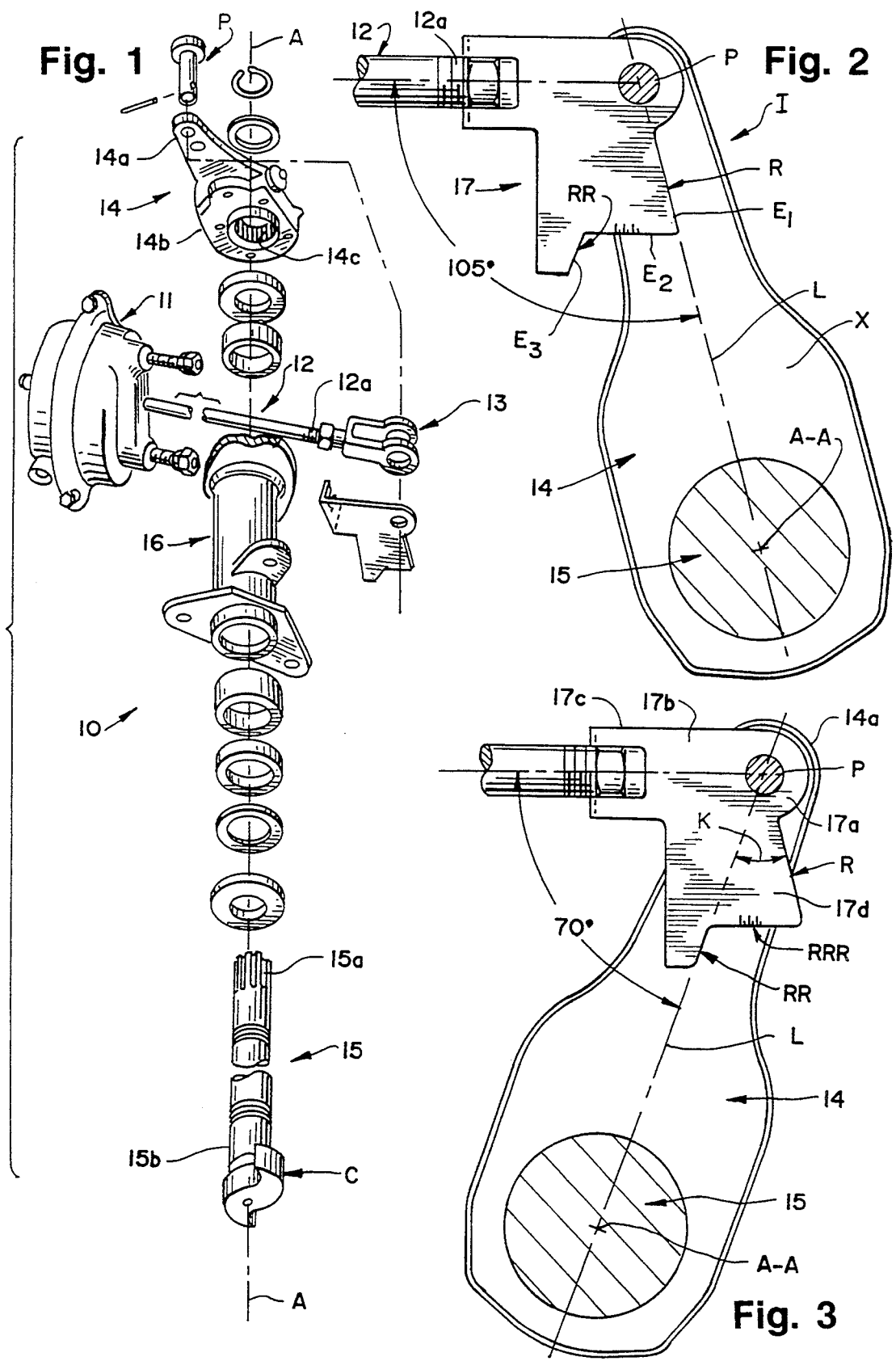

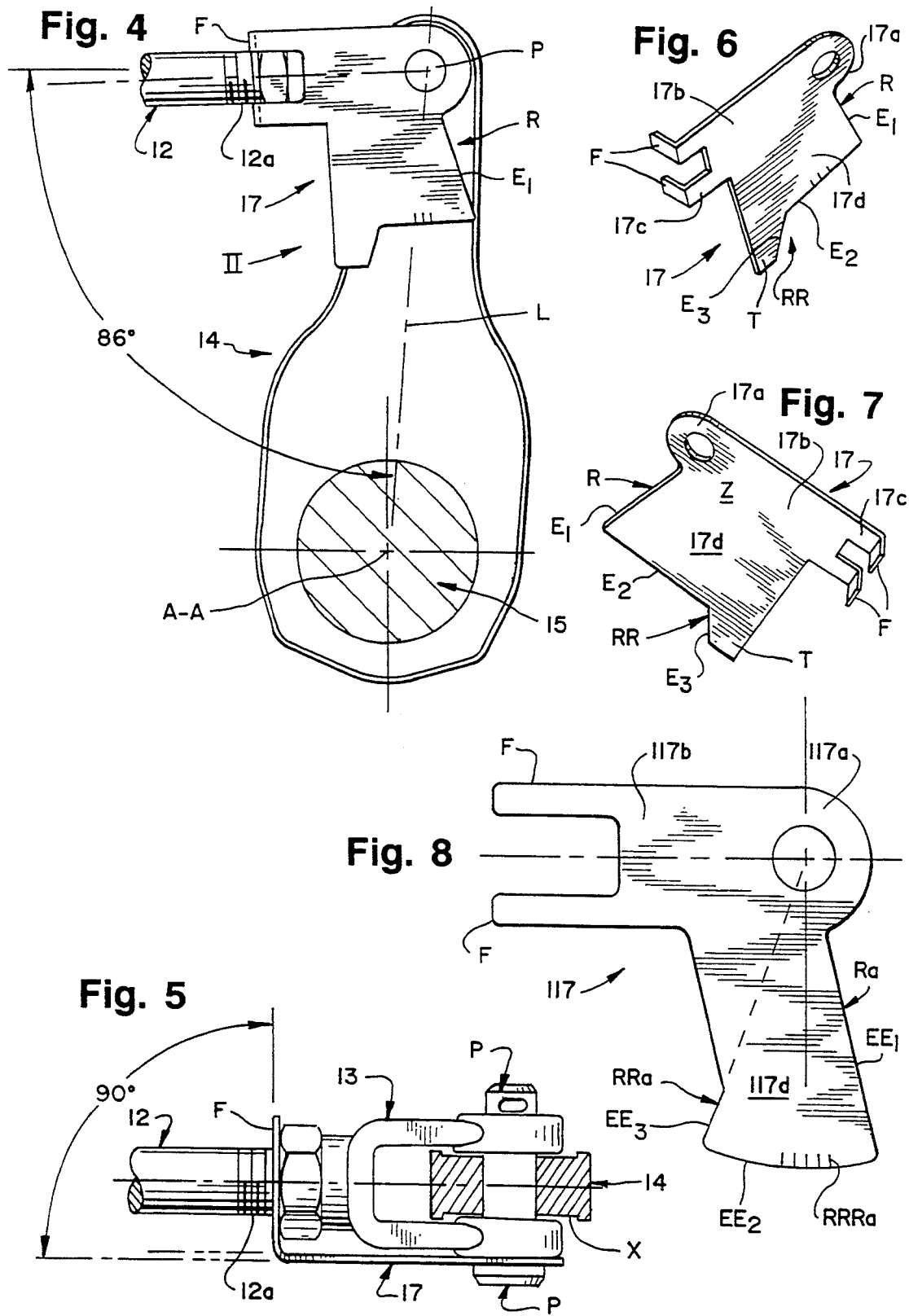

INDICATOR UNIT FOR AN AIR BRAKE SYSTEM

BACKGROUND OF THE INVENTION

Faulty braking systems on vehicles, particularly heavy duty vehicles such as trucks and buses, can result in serious accidents on highways, roads and city streets. One primary factor contributing to the faulty operation of such braking systems results from wear of various brake components which necessitates an inordinate amount of manual effort to be applied by the vehicle operator to effect braking of the vehicle. In an extreme wear situation an inadequate or total lack of braking results. Safety studies have indicated that if under predetermined vehicle operating parameters adequate braking of the moving vehicle has not been attained before there has been 80% of the brake rod or push rod stroke, then a serious braking condition exists requiring immediate attention by maintenance personnel. To determine whether the braking system is working properly frequently required in the past tests being performed on a moving vehicle and subsequent visual inspection being made by a skilled mechanic of the braking components after the braking system had been substantially disassembled. In lieu of such moving vehicle tests, static tests were frequently performed; however, to properly perform such tests and to make visual inspection of various components thereof still required substantial disassembly of the system, the utilization of complex and costly testing equipment by skilled personnel, and an inordinate amount of down-time for the vehicle.

SUMMARY OF THE INVENTION

Thus, an improved braking system has been provided which enables accurate determination of the condition of a braking system to be made expeditiously and in a facile manner without requiring any disassembly of the system.

An improved indicator unit has been provided which may be readily incorporated in new braking systems or retrofit on older systems and assists the installer in readily ascertaining the proper length of the brake rod for a given air brake chamber.

The improved indicator unit is of simple, inexpensive construction, may be readily utilized without the need for specialized test equipment or tools and does not require the vehicle to be moved to a particular testing location.

Further and additional advantages of the improved vehicle braking system and indicator unit will become apparent from the description, accompanying drawings and appended claims.

In accordance with one embodiment of the invention, an improved vehicle braking system has been provided which includes a brake rod means mounted for stroke adjustment between a non-braking first position and a predetermined safe maximum braking second position. The rod means has a distal end which is pivotally connected to a first portion of a slack adjuster means. A second portion of the adjuster means is mounted for movement about a fixed pivotal axis. Movement of the adjuster means is responsive to the adjustment of the brake rod means between the first and second positions and actuates or de-actuates braking of he vehicle. The systems also includes an indicator unit having a first section which is mounted on the pivotal connection between the rod means distal end and the adjuster means first portion. A second section of the unit extend from the first section and is retained in a predetermined alignment with the rod means regardless of the adjustment of the latter. A third section of the unit extends from the first section and is angularly disposed relative to the second section. The third section is provided with exposed angularly spaced first and second reference means. The first reference means is aligned with an exposed predetermined segment of the adjuster means when the rod means is in the first position. The second reference means is aligned with the exposed predetermined segment of the adjuster means when the rod means is in the second position.

DESCRIPTION

For a more complete understanding of the invention reference should be made to the drawings wherein:

FIG. 1 is a fragmentary perspective view of one embodiment of the improved vehicle braking system showing the components thereof in exploded relation.

FIG. 2 is an enlarged, fragmentary elevational view of one embodiment of the indicator unit in combination with the slack adjuster and the brake rod, when the latter is in a first or non-braking position of adjustment.

FIG. 3 is like FIG. 2 but showing the brake rod in a maximum applied position allowable. This position indicates that a brake adjustment is necessary.

FIG. 4 is like FIG. 3 but showing the brake rod in optimal braking position for a given size air brake chamber.

FIG. 5 is an enlarged fragmentary top view of the structure shown in FIG. 2.

FIGS. 6 and 7 are enlarged, fragmentary perspective views of the exposed and concealed sides of one embodiment of the improved indicator unit per se.

FIG. 8 is an enlarged, elevational view of the exposed side of a second embodiment of the indicator unit.

Referring now to the drawings and more particularly to FIG. 1 one embodiment of the improved vehicle braking system 10 is shown. Basically, system 10 includes an air chamber 11 of conventional design which is normally affixed to the underside of a vehicle. Protruding from one side of the chamber and mounted for longitudinal movement in response to the direction of air pressure applied within the chamber is an elongate brake rod 12. The exposed, distal end or segment 12a of rod 12 is provided with an adjustable connector (e.g. clevis) 13 which, in turn, is pivotally connected by a removable pintle P to a first portion 14a of a slack adjuster 14. A second portion 14b of the adjuster is provided with an internally splined opening 14c. The opening 14c is adapted to accommodate an externally splined end 15a of an elongate actuator rod 15. The rod is supported by a bracketed bearing sleeve 16. The opposite end 15b of rod 15 is provided with a cam C which, in response to the movement of the rod about its longitudinal axis A—A, will cause the brake shoes, not shown, to engage or disengage a conventional brake drum, not shown, which is a component of the vehicle wheel.

In operating the brake system 10, the vehicle driver or operator manipulates either a hand lever or foot pedal not shown which in turn controls the flow of compressed air into or out of the chamber 11. The extent to which the lever or foot pedal is manipulated determines the amount of braking force being applied to the wheel drum to affect adequate braking of the vehicle.

It has been determined by standardized safety tests that adequate braking should occur within 80% of the safe braking stroke of the brake rod 12. If such braking action does not occur during such 80% of the stroke, it is indicative to the operator or mechanic that various components such as brake shoes and/or wheel drum surfaces are worn to such an extent that safe operation of the vehicle has been seriously impaired. In such a situation, adjustment of the brake shoes and possibly grinding of the drum surfaces is required.

An indicator unit 17 is connected to the connector 13 by a pivot pintle P, the latter also providing the pivotal connection between the brake rod 12 and the adjuster portion 14a. As seen in FIGS. 6 and 7, the indicator unit 17 is preferably of one piece construction and is disposed so as to overlie an exposed side of the adjuster 14, see FIGS. 2-4. Unit 17 includes an apertured first section 17a through which a portion of the pintle P extends. Extending laterally from the first section 17a is a second section 17b which may be provided with a bifurcated edge 17c. The second section 17b is in alignment with the longitudinal axis of brake rod 12 and is maintained in such alignment by fingers F of the bifurcated edge straddling the distal end portion 12a of the rod.

Unit 17 also includes a third section 17d which is substantially coplanar with and angularly disposed relative to the first and second sections. Third section 17d overlies an exposed side of adjuster 14, see FIGS. 2-4. The third section 17d, in the illustrated embodiment, is provided with a first reference means R in the form of a rectilinear side edge $E_1$, which extends radially in one direction from the axis of pintle P. In lieu of edge $E_1$, a rectilinear stripe or rib, not shown extending radially from the pintle axis may be provided on the exposed surface of the third section 17d. In either case (e.g., edge $E_1$, stripe or rib), the lower end of the first reference means R should preferably terminate at a lower edge $E_2$, of the third section 17d. The location of the first reference means R is such that, when the system 10 is in a non-braking mode I, see FIG. 2, the reference means R will be aligned with a rectilinear line L on the adjuster, which line interconnects the axis of pintle P with the axis A—A of actuator rod 15.

The third section 17d of the indicator unit 17, illustrated in FIGS. 6 and 7, is provided with a depending thumb-like protuberance T. One depending edge $E_3$, of protuberance T is rectilinear and forms a second reference means RR. As in the case of $E_1$, the depending edge $E_3$ extends radially from the axis of pintle P but in a second direction relative to edge $E_1$. The edge $E_3$ is utilized by the installer to initially determine if the brake rod 12 is too long or too short for proper system operation. If the line L of the adjuster falls outside the area K of the indicator unit 17 disposed between reference means R and RR when the adjuster is initially connected to rod 12, then the installer immediately knows that the rod is too long or too short and must be replaced with a different rod or cut same to a new length. So long as the line L is disposed within area K when the rod is connected to the adjuster then the installer can adjust the length of the rod by threading or unthreading the connector 13 on the rod end 12a so as to bring the reference means R into alignment with Line L when the system is in non-braking mode I.

When the system 10 is in the second mode II, see FIG. 4, the brake rod 12 has been moved through 80% of its safe operating stroke whereby a reference means or mark RRR is aligned with the rectilinear line L of the adjuster 14. When the system 10 is in either mode I or II, the relative position of the indicator unit reference means R or RRR can be readily observed by looking at the underside of the vehicle in which the braking system is installed. Thus, when the brakes are set no components of the vehicle, including the braking system, need to be removed in order to determine the operating condition of the braking system.

As seen in FIGS. 2-4, reference means or marks RRR are provided on Edge $E_2$ and may be in the form of exposed short hash marks arranged in predetermined spaced relation along the lower edge. Depending on the size or type air brake chamber, one of the marks RRR when aligned with line L of adjuster 14 readily indicates to the mechanic when the brake rod has moved through 80% of its safe braking stroke.

FIG. 8 discloses a second embodiment of the indicator unit 117 wherein the lower edge $EE_2$ of the third section 117d has an arcuate configuration rather than rectilinear as with edge $E_2$ of unit 17. Furthermore, the lower edge $EE_2$ does not include the thumb-like protuberance T previously described. The arcuate edge $EE_2$ is provided with a plurality of reference marks $RRR_a$. These marks are utilized in the same way as previously described with respect to unit 17. The first reference mark $R_a$ R of unit 117 is similar to the first reference mark R of unit 17 and is defined by a rectilinear side edge $EE_1$ of the third section 117d. A second reference mark $RR_a$ is defined by the opposite rectilinear side edge $EE_3$ of the unit third section 117d. Both of the edges $EE_1$ and $EE_3$ are radially aligned with the axis of pintle P and are angularly disposed relative to one another.

The indicator unit may have other configurations from that shown in the drawings provided that a portion of the unit (e.g. second section 17b) remains in alignment with the brake rod 12 regardless of the mode the system assumes. Furthermore, the unit should have two angularly disposed reference marks which are adapted to independently align with an exposed common reference mark on the adjuster. The indicator unit 17 or 117 may be readily installed on new braking systems or retrofit on existing systems by merely removing the pintle P connecting the adjuster 14 to the connector 13, and then placing the unit in overlying relation with the exposed surface X of the adjuster. When in place, the concealed surface Z of the unit, see FIG. 7, is in close proximity to the adjuster exposed surface X and the fingers F of the unit second section 17b or 117b are offset so as to straddle a portion of the brake rod 12. The spacing between the offset fingers closely approximates the diameter of the brake rod being straddled so that the unit and brake rod will remain in alignment with each other. Once the unit is in proper position, the pintle P is reinserted through the aligned openings formed in the unit 17 or 117, the connector 13 and the adjuster portion 14a. No further assembly or disassembly of the braking system is required unless the brake rod 12 is too long and needs to be replaced or made shorter. The indicator unit is of simple, inexpensive construction, and embodies no moving parts which might become out of adjustment during normal use of the system.

I claim:

1. In a vehicle brake system having a brake rod means mounted for movement between a non-braking first position and a predetermined safe maximum braking second position, and a pivotally mounted slack adjuster means having a portion thereof operatively connected to a distal segment of the brake rod means, the adjuster means being movable about a pivotal axis in response to the movement of the brake rod means between the first and second positions, an indicator unit comprising a first section mountable on the operative connection between the rod means distal segment and the adjuster means portion, a second section extending laterally from said first section and being adapted to engage and be movable with the brake rod means, and a third section angularly disposed relative to said second section and extending laterally from said first section and being adapted to overlie an exposed surface of the adjuster means, said third section having a first reference means for alignment with an exposed predetermined first segment of the adjuster means when the rod means is in the first position, and a second reference means for alignment with an exposed predetermined second segment of the adjuster means when the rod means is in the second position, said first and second reference means being angularly disposed relative to one another, the angular relationship being intersecting in orientation.

2. The indicator unit of claim 1 wherein the rod means distal segment and the portion of the slack adjuster means are pivotally interconnected, and the first section of the indicator unit is adapted to be mounted coaxially with the pivotal interconnection between the distal segment and the adjuster means portion.

3. The indicator unit of claim 1 wherein the third section thereof is provided with at least a third reference means and said second reference means is disposed intermediate of said first and third reference means.

4. The indicator unit of claim 1 wherein the first, second, and third sections thereof are of a unitary construction.

5. In the brake system of claim 1 wherein the indicator unit is of unitary construction and the first and second reference means define a predetermined included angle relative to the pivotal connection between the rod means distal segment and the adjuster means first portion.

6. In a vehicle brake system having a brake rod means mounted for movement between a non-braking first position and a predetermined safe maximum braking second position, and a pivotally mounted slack adjuster means having a portion thereof operatively connected to a distal segment of the brake rod means, the adjuster means being movable about a pivotal axis in response to the movement of the brake rod means between the first and second positions, an indicator unit comprising a first section mountable on the operative connection between the rod means distal segment and the adjuster means portion; a second section extending laterally from said first section and being adapted to engage and be movable with the brake rod means, said second section including a bifurcated segment for straddling a portion of the brake rod means spaced from the distal segment thereof and maintaining the second section in a predetermined aligned relation with the rod means; and a third section angularly disposed relative to said second section and extending laterally from said first section and being adapted to overlie an exposed surface of the adjuster means, said third section having a first reference means for alignment with an exposed predetermined first segment of the adjuster means when the rod means is in the first position, and a second reference means for alignment with an exposed predetermined second segment of 7. In a vehicle brake system having a brake rod means mounted for movement between a non-braking first position and a predetermined safe maximum braking second positions and a pivotally mounted slack adjuster means having a portion thereof operatively connected to a distal segment of the brake rod means, the adjuster means being movable about a pivotal axis in response to the movement of the brake rod means between the first and second positions, an indicator unit comprising a first section mountable on the operative connection between the rod means distal segment and the adjuster means portion; a second section extending laterally from said first section and being adapted to engage and be movable with the brake rod means; and a third section angularly disposed relative to said second section and extending laterally from said first section and being adapted to overlie an exposed surface of the adjuster means, said third section having a first reference means for alignment with an exposed predetermined first segment of the adjuster means when the rod means is in the first position, and a second reference means for alignment with an exposed predetermined second segment of the adjuster means when the rod means is in the second position, each reference means extending in a substantially radial direction from the operative connection between the brake rod means and the adjuster means, the first and second reference means being angularly disposed relative to one another.

8. The indicator unit of claim 7 wherein the first and second reference means define a predetermined included angle.

9. In a vehicle brake system having a brake rod means mounted for movement between a non-braking first position and predetermined safe maximum braking second .position, and a pivotally mounted slack adjuster means having a portion thereof means, the adjuster means being movable about a pivotal axis in response to the movement of the brake rod means between the first and second positions, an indicator unit comprising a first section mountable on the operative connection between the rod means distal segment and the adjuster means portion; a second section extending laterally from said first section and being adapted to engage and be movable with the brake rod means; and a third section angularly disposed relative to said second section and extending laterally from said first section and being adapted to overlie an exposed surface of the adjuster means, said third section having a first reference means for alignment with an exposed predetermined first segment of the adjuster means when the rod means is in the first position, and a second reference means for alignment with an exposed predetermined second segment of the adjuster means when the rod means is in the second position, said first reference means including a rectilinear peripheral edge formed on the third section, said edge being in substantial radial alignment with the operative connection between the brake rod means and the adjuster means.

10. An indicator unit for a vehicle brake system having a brake rod means mounted for movement between a non-braking first position and a predetermined safe, maximum braking second position, and a slack adjuster means having a first portion pivotally connected to a distal end of the rod means and a second portion mounted for pivotal movement about a fixed axis in response to the movement of the rod means; such indicator unit comprising a first section removably mountable on the pivotal connection between the rod means distal end and the adjuster means first portion; a second section extending from said first section and adapted to be retained in a predetermined alignment with the rod means, the second section including a bifurcated segment for straddling a portion of the rod means; and a third section extending from said first section and being angularly disposed relative to said second section, said third section being provided with an exposed first reference means, the latter adapted to be aligned with an exposed predetermined segment of the adjuster means when the rod means is in the first position, and an exposed second reference means spaced from said first reference means and adapted to be aligned with the exposed predetermined segment of the adjuster means when the rod means is in said second position.

* * * * *